US012631233B2

(12) United States Patent
Poquadeck et al.

(10) Patent No.: US 12,631,233 B2
(45) Date of Patent: May 19, 2026

(54) BRAKE ROTOR ASSEMBLY AND METHOD OF ASSEMBLY

(71) Applicant: ArvinMeritor Technology, LLC, Troy, MI (US)

(72) Inventors: Dana Poquadeck, Troy, MI (US); Jason A. Eaton, Troy, MI (US); Puneeth H. Partha Shetty, Bangalore (IN)

(73) Assignee: ArvinMeritor Technology, LLC, Troy, MI (US)

( * ) Notice: Subject to any disclaimer, the term of this patent is extended or adjusted under 35 U.S.C. 154(b) by 535 days.

(21) Appl. No.: 18/299,376

(22) Filed: Apr. 12, 2023

(65) Prior Publication Data

US 2023/0383804 A1     Nov. 30, 2023

(30) Foreign Application Priority Data

May 27, 2022    (IN) .............................. 202211030528

(51) Int. Cl.
| | |
|---|---|
| *F16D 66/00* | (2006.01) |
| *B60T 17/22* | (2006.01) |
| *F16D 65/12* | (2006.01) |
| F16D 65/02 | (2006.01) |

(52) U.S. Cl.
CPC .............. *F16D 66/00* (2013.01); *B60T 17/22* (2013.01); *F16D 65/123* (2013.01); *B60T 2240/00* (2013.01); *F16D 2065/1392* (2013.01); *F16D 2066/003* (2013.01); *F16D 2250/0084* (2013.01)

(58) Field of Classification Search
CPC ..................... F16D 66/00; F16D 65/12; F16D 65/123–127; F16D 2065/1392; F16D 2066/003; F16D 2250/0084; B60T 2240/00
USPC .................................................... 188/218 XL
See application file for complete search history.

(56) References Cited

U.S. PATENT DOCUMENTS

| | | | |
|---|---|---|---|
| 4,161,120 A | 7/1979 | Cloarec | |
| 4,946,296 A | 8/1990 | Olschewski | |
| 5,031,967 A | 7/1991 | Svensson | |
| 5,476,272 A | 12/1995 | Hixson | |
| 5,695,289 A | 12/1997 | Ouchi | |
| 6,095,291 A * | 8/2000 | Bertetti | F16D 65/123 |
| | | | 188/18 R |
| 6,186,667 B1 | 2/2001 | Nakamura | |
| 6,217,220 B1 | 4/2001 | Ohkuma | |
| 6,457,869 B1 | 10/2002 | Smith | |
| 7,455,459 B2 | 11/2008 | Toth | |
| 7,779,969 B2 | 8/2010 | Gonska | |
| 8,020,676 B2 | 9/2011 | Bradley | |
| 9,261,144 B2 | 2/2016 | Duch | |
| 9,506,515 B2 | 11/2016 | White et al. | |
| 10,495,163 B2 | 12/2019 | White et al. | |

(Continued)

FOREIGN PATENT DOCUMENTS

| | | |
|---|---|---|
| DE | 102014106519 A1 | 11/2015 |
| EP | 0822413 A2 | 7/1997 |

(Continued)

*Primary Examiner* — Christopher P Schwartz
(74) *Attorney, Agent, or Firm* — Dickinson Wright PLLC

(57) ABSTRACT

A brake rotor assembly and a method of assembly. The brake rotor assembly includes a brake rotor, a tone ring, and a rivet. The rivet is disposed in a hole in the brake rotor and a hole in the tone ring and fixedly secures the tone ring to the brake rotor.

16 Claims, 9 Drawing Sheets

(56) References Cited

U.S. PATENT DOCUMENTS

| | | | |
|---|---|---|---|
| 10,704,602 B2 | 7/2020 | Gonska | |
| 11,226,020 B2 | 1/2022 | Gonska et al. | |
| 11,519,471 B2 * | 12/2022 | Bozovic | F16D 65/12 |
| 11,773,933 B2 * | 10/2023 | Hollstein | F16D 65/125 |
| | | | 188/218 XL |
| 2007/0211974 A1 | 9/2007 | Toth et al. | |
| 2008/0023277 A1 * | 1/2008 | Gonska | B60B 27/02 |
| | | | 188/218 XL |
| 2008/0164109 A1 * | 7/2008 | Guether | F16D 65/12 |
| | | | 188/218 XL |
| 2009/0218183 A1 * | 9/2009 | Burgoon | B60T 8/329 |
| | | | 188/218 XL |
| 2014/0239597 A1 | 8/2014 | White et al. | |
| 2015/0021128 A1 * | 1/2015 | White | F16D 65/12 |
| | | | 188/218 XL |
| 2015/0107742 A1 | 4/2015 | Knapke et al. | |
| 2016/0059626 A1 | 3/2016 | Gemello et al. | |
| 2016/0318359 A1 | 11/2016 | Knapke et al. | |

FOREIGN PATENT DOCUMENTS

| | | | |
|---|---|---|---|
| EP | 2980432 A1 | 3/2014 | |
| JP | 2004169925 | 6/2004 | |

* cited by examiner

BRAKE ROTOR ASSEMBLY AND METHOD OF ASSEMBLY

TECHNICAL FIELD

The invention relates to a brake rotor assembly and a method of assembly.

BACKGROUND

A brake rotor experiences axial and radial deflection during braking (i.e., when the friction material or brake lining of the brake pads contact and exert force against opposite sides of the brake rotor to slow rotation of the brake rotor and an associated vehicle wheel). Such deflection is caused by mechanical load forces exerted by the brake pads against the brake rotor as well as thermal loading due to friction between the friction material and the brake rotor. Thermal loading causes thermal growth of the brake rotor (e.g., dimensional expansion of the brake rotor as the temperature of the brake rotor increases). Thermal growth may vary at different locations on the brake rotor due to uneven heating. For instance, thermal growth of the brake rotor may be greater where the friction material engages the brake rotor. Conversely, axial and radial deflection may subside after the brake pads are disengaged from the brake rotor and the brake rotor cools. Thus, the brake rotor deflection must be accounted for when attempting to mount other components on a brake rotor.

Reliably securing a tone ring to a brake rotor for an extended period of time (e.g., for the life of the brake rotor) has proven to be particularly challenging. A tone ring and the brake rotor may have different growth rates or different coefficients of thermal expansion when the tone ring and the brake rotor are made of different materials. As such, the tone ring and a brake rotor made of different materials may experience different amounts of growth and relative movement in response to temperature changes.

A tone ring that is press-fit or snap-fit against a brake rotor is susceptible to disengagement from the brake rotor due to thermal growth differences or different rates of expansion that can cause the press-fit or snap-fit to loosen and allow the tone ring to disengage the brake rotor. Similarly, tone ring that is secured with one or more unthreaded fasteners such as clips, hooks, pins, roll pins, or the like are also susceptible to loosening and disengagement due to thermal growth differences (i.e., different rates of expansion between mating components) and vibration. A tone ring that is secured to a brake rotor with a snap ring is susceptible to movement due to vibration and oxide jacking (also known as rust jacking). Vibration or vibration loading may be caused by wheel-end imbalance, modal vibration, and rough road conditions. Thus, these fastening techniques require manufacturing brake rotors and/or tone rings with complex tolerancing and machining, which can require expensive manufacturing equipment and more expensive manufacturing processes.

Welding or bonding a tone ring to a brake rotor is also challenging due to the different rates of thermal expansion. Welding a tone ring can distort the tone ring and may require increased package space on the brake rotor to accommodate the weld, which can increase weight and cost.

A tone ring that is secured to a brake rotor with one or more threaded fasteners is not a robust design option. A threaded fastener is susceptible to loosening or unthreading due to a variety of load forces, such as mechanical loading, thermal loading, vibration loading, or combinations thereof. Moreover, packaging space restricts the size and length of a threaded fastener, which in turn limits the clamp load and the amount of friction that can be generated between the head of the fastener and the surface of the tone ring or brake rotor that is engaged by the underside of the head of the fastener. Adhesives, such as thread locking adhesives, are not suited for the temperatures a brake rotor incurs during use, can be messy to apply, and increase assembly costs.

As such, there has been a long felt need for a better manner of securing a tone ring to a brake rotor. The present invention is directed to solving such problems.

SUMMARY

In at least one embodiment, a brake rotor assembly is provided. The brake rotor assembly includes a brake rotor, a tone ring, and a rivet. The brake rotor encircles a brake rotor axis. The brake rotor as a mounting flange. The mounting flange extends toward the brake rotor axis and has a through hole. The tone ring engages the mounting flange and defines a tone ring hole. The rivet is disposed in the through hole and the tone ring hole. The rivet fixedly secures the tone ring to the brake rotor.

The mounting flange may have a first side that faces toward the tone ring. The mounting flange may have a second side that is disposed opposite the first side. The through hole may extend from the first side to the second side. The first side may be disposed substantially perpendicular to the brake rotor axis. The second side may be disposed at an oblique angle with respect to the first side. The mounting flange may have a step surface.

The through hole may extend along a through hole axis. The through hole may have a first hole portion. The first hole portion may extend from the first side to the step surface. The step surface may be is axially positioned with respect to the through hole axis between the first side and the second side.

The through hole may have a second hole portion. The second hole portion may extend from the second side to the step surface. The first hole portion may be disposed closer to the through hole axis than the second portion is disposed to the through hole axis.

The rivet may have a first rivet head and a second rivet head. The first rivet head may contact the step surface. The second rivet head may be disposed opposite the first rivet head. The second rivet head may contact the tone ring.

The brake rotor may have a hub mounting flange. The hub mounting flange may encircle the brake rotor axis. The hub mounting flange may be spaced apart from the mounting flange of the brake rotor. The hub mounting flange may extend further toward the brake rotor axis than the mounting flange extends toward the brake rotor axis.

The hub mounting flange may define a fastener hole. The fastener hole may be adapted to receive a fastener for coupling the brake rotor to a wheel hub.

The hub mounting flange may define an access hole. The access hole may be spaced apart from the fastener hole. The access hole may be aligned with the through hole of the mounting flange. The access hole may be disposed further from the brake rotor axis than the fastener hole is disposed from the brake rotor axis. The access hole and the second hole portion of the through hole may have substantially the same radius. The access hole and the second hole portion may be connected by an undercut surface. The undercut surface may be radially disposed with respect to the through hole axis. The access hole may be partially formed in an annular wall of the brake rotor. The annular wall may extend from the mounting flange to the hub mounting flange.

In at least one embodiment, a method of assembling a brake rotor assembly is provided. The method includes positioning a tone ring against a brake rotor such that a tone ring hole is aligned with a through hole in the brake rotor to permit insertion of a rivet. The rivet is inserted into the through hole and the tone ring hole. The rivet is upset to form a rivet head. The rivet is upset to expand a portion of the rivet that is disposed in the through hole away from the rivet axis and into contact with the brake rotor in the through hole. The rivet is upset to expand a portion of the rivet that is disposed in the tone ring hole away from the rivet axis and into contact with the tone ring in the tone ring hole.

The rivet may have a preformed first rivet head. Inserting the rivet may include positioning the first rivet head into contact with a mounting flange of the brake rotor. Inserting the rivet may include positioning the first rivet head into contact with the step surface of the mounting flange.

Upsetting the rivet may include engaging a first mandrel with the first rivet head, engaging a second mandrel with an end of the rivet that is disposed opposite the first rivet head, and exerting force along the rivet axis toward the rivet with the first mandrel and the second mandrel to upset the rivet.

Engaging the first mandrel with the first rivet head may include inserting the first mandrel through an access hole in a hub mounting flange of the brake rotor. Engaging the first mandrel with the first rivet head may include positioning the first mandrel between the mounting flange and the hub mounting flange of the brake rotor. The first mandrel may be inserted into the second hole portion of the through hole.

The rivet may be a blind rivet. The rivet may have a preformed first rivet head. Inserting the rivet may include positioning the first rivet head into contact with the tone ring. The rivet may have a rivet mandrel that has a rivet mandrel head. Upsetting the rivet may include actuating the rivet mandrel along the rivet axis toward the first rivet had to cause the rivet mandrel head to expand the portion of the rivet that is disposed in the through hole and the tone ring hole. A portion of the rivet that is disposed in the through hole may be expanded into contact with the brake rotor. A portion of the rivet that is disposed in the tone ring hole may be expanded into contact with the tone ring. A portion of the rivet mandrel that protrudes from the first rivet head may be removed after expanding the rivet.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
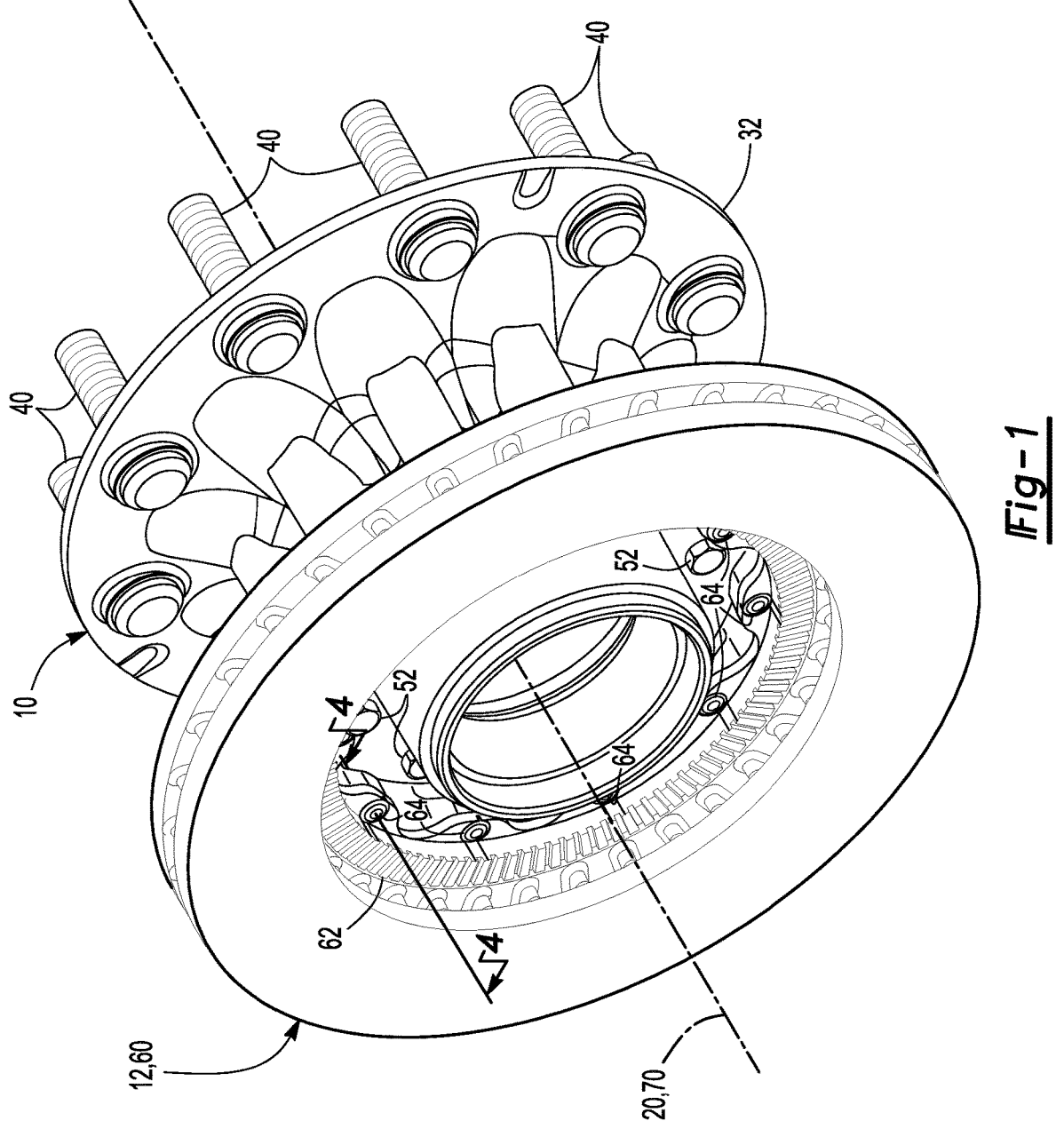
FIG. 1 is a perspective view of an example of a brake rotor assembly mounted to a wheel hub, the brake rotor assembly having a tone ring that is attached to a brake rotor with a rivet.

Referring to FIG. 1, an example of a wheel hub 10 and a brake rotor assembly 12 is shown. The wheel hub 10 and the brake rotor assembly 12 may be provided with a vehicle like a truck, bus, farm equipment, military transport or weaponry vehicle, or cargo loading equipment for land, air, or marine vessels or a trailer that may be provided with a vehicle.

Figure 3:
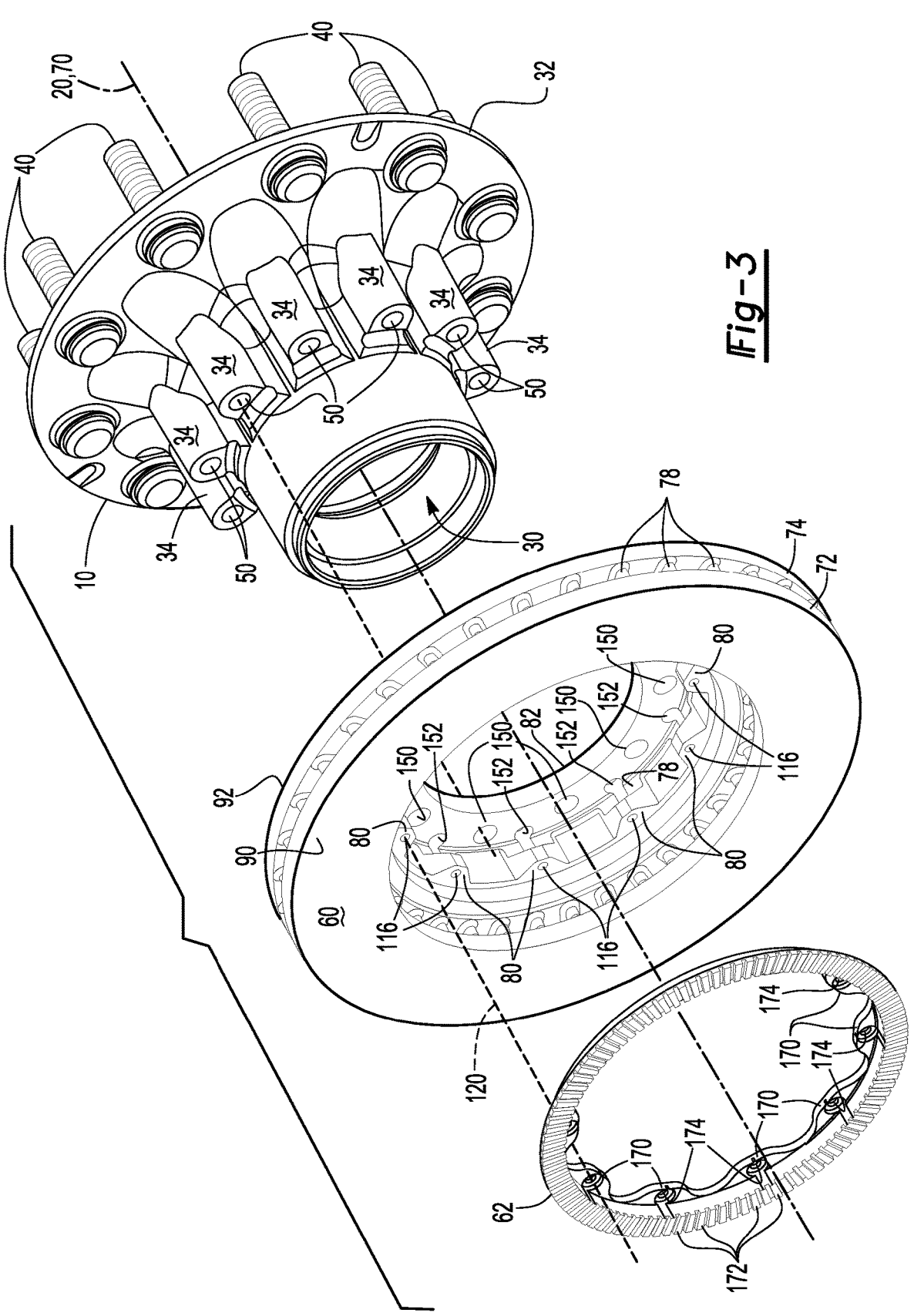
FIG. 3 is an exploded view of FIG. 1 that omits rivets and omits fasteners that couple the brake rotor to the wheel hub for clarity.

Referring to FIGS. 1 and 3, the wheel hub 10 may facilitate mounting and rotation of a wheel upon which a tire may be mounted. In addition, the wheel hub 10 may be rotatable about an axis 20. In at least one configuration, the wheel hub 10 may include a hub cavity 30, a mounting flange 32, and one or more mounting bosses 34.

Referring to FIG. 3, the hub cavity 30 may extend around the axis 20. The hub cavity 30 may receive various components that may facilitate rotation of the wheel hub 10. For instance, the hub cavity 30 may receive one or more wheel bearings that rotatably support the wheel hub 10 on a structural component, such as a spindle. The wheel bearings may encircle the spindle and permit the wheel hub 10 to rotate about the axis 20 with respect to the spindle.

The mounting flange 32 may extend away from the axis 20 and the hub cavity 30. A plurality of lug bolts 40 may extend through holes in the mounting flange 32 to facilitate mounting of a wheel in a manner known by those skilled in the art.

One or more mounting bosses 34 may be provided to facilitate mounting of the brake rotor assembly 12 to the wheel hub 10. For instance, a plurality of mounting bosses 34 may be provided that are arranged around the axis 20 and that extend away from the axis 20 and the hub cavity 30. The mounting bosses 34 may be configured as lobes that may be spaced apart from each other such that a gap is provided between adjacent mounting bosses. It is also contemplated that the gaps may be omitted, in which case a single unified mounting boss may be provided.

Figure 2:
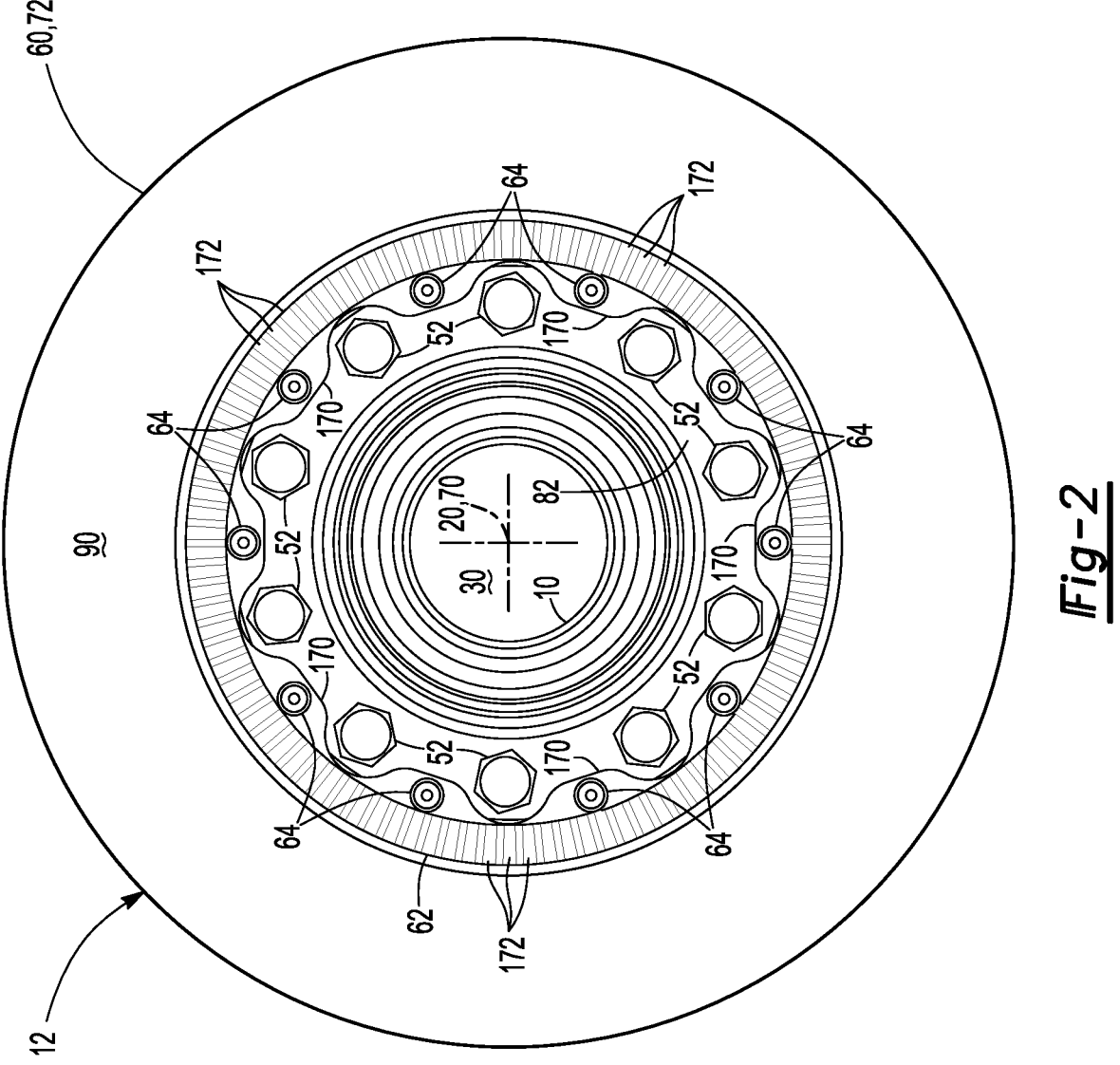
FIG. 2 is a side view of FIG. 1.

A fastener hole 50 may be provided with the mounting boss 34. Fastener holes 50 may be arranged around the axis 20 and may extend substantially parallel to the axis 20. The term "substantially parallel" as used herein means the same as or very close to parallel and includes features or axes that are within ±3° of being parallel each other. A fastener hole 50 may receive a fastener 52, such as a bolt as is best shown in FIGS. 1 and 2. The fastener 52 may secure the brake rotor assembly 12 to the wheel hub 10. For instance, the brake rotor assembly 12 may contact or engage the mounting bosses 34 and the fasteners 52 may attach the brake rotor assembly 12 to the wheel hub 10 such that the brake rotor assembly 12 is inhibited from moving along the axis 20 with respect to the wheel hub 10 and such that the brake rotor assembly 12 and the wheel hub 10 are rotatable together about the axis 20.

Referring to FIGS. 1 and 2, the brake rotor assembly 12 may encircle the axis 20 and a portion of the wheel hub 10. The brake rotor assembly 12 may include a brake rotor 60, a tone ring 62, and at least one rivet 64.

Referring primarily to FIG. 3, the brake rotor 60 may be a separate component from the wheel hub 10 and the tone ring 62. In addition, the brake rotor 60 may be made of a different material than the tone ring 62. For instance, the brake rotor 69 may be made of a metal alloy like cast iron while the tone ring 62 may be made of a different metal alloy, such as steel. As such, the brake rotor 60 and the tone ring 62 may have different coefficients of thermal expansion.

The brake rotor 60 may be associated with a friction brake that is configured as a disc brake and may have friction surfaces that may facilitate braking of the wheel hub 10 and a corresponding wheel. The brake rotor 60 may encircle and may be rotatable about a brake rotor axis 70, which may be the same as the axis 20 when the brake rotor 60 is mounted to the wheel hub 10. In at least one configuration and as is best shown with Reference to FIGS. 3 and 4, the brake rotor 60 may include a first panel 72, a second panel 74, a set of vanes 76, an annular wall 78, a mounting flange 80, a hub mounting flange 82, or combinations thereof.

Referring to FIG. 3, the first panel 72 may be configured as a ring that may extend around the axis 20. The first panel 72 may have a first friction surface 90.

The first friction surface 90 may be engaged by friction material of a first brake pad to slow rotation of the brake rotor 60 and the wheel about the axis 20. The first friction surface 90 may be substantially planar. In addition, the first friction surface 90 may be disposed substantially perpendicular to the axis 20. The term "substantially perpendicular" is used to designate features or axes that are the same as or very close to perpendicular and includes features that are within ±3° of being perpendicular each other.

The second panel 74 may be spaced apart from the first panel 72. The first panel 72 and the second panel 74 may have substantially similar configurations. Accordingly, the second panel 74 may be configured as a ring that may extend around the axis 20 and may have a second friction surface 92.

The second friction surface 92 may be engaged by friction material of second brake pad to slow rotation of the brake rotor 60 and the wheel about the axis 20. The second friction surface 92 may face away from the first friction surface 90 and may be substantially planar. In addition, the second friction surface 92 may be disposed substantially perpendicular to the axis 20 and may be disposed substantially parallel to the first friction surface 90.

The set of vanes 76 may extend from the first panel 72 to the second panel 74. The vanes 76 may be arranged around the brake rotor axis 70 and may interconnect the first panel 72 with the second panel 74 while providing an air gap between the first panel 72 and the second panel 74 that may facilitate cooling of the brake rotor 60.

Figure 4:
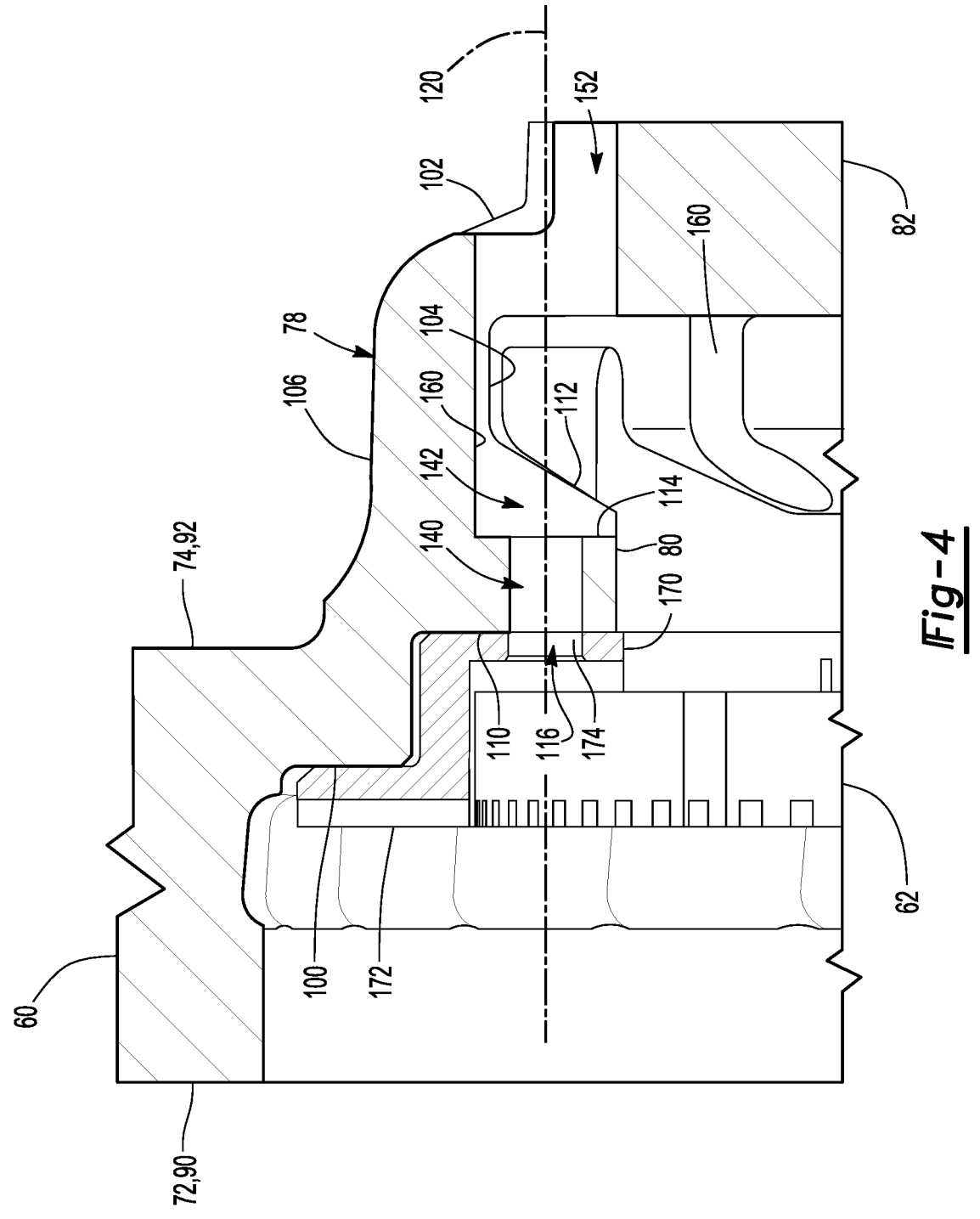
FIG. 4 is a magnified section view along section line 4-4 prior to installation of a rivet.

Referring to FIGS. 3 and 4, the annular wall 78 may extend around or encircle the brake rotor axis 70. The annular wall 78 may extend from the second panel 74 in a direction that extends away from the first panel 72. The annular wall 78 may have a first end 100, a second end 102, an inner side 104, an outer side 106.

The first end 100 may face toward and may engage the tone ring 62. The first end 100 may extend from the second panel 74 and may be disposed substantially perpendicular to the brake rotor axis 70.

The second end 102 may be disposed opposite the first end 100. As such, the second end 102 may face toward the wheel hub 10 when the brake rotor 60 is mounted to the wheel hub 10. In addition, the second end 102 may be offset from the hub mounting flange 82 such that the second end 102 is spaced apart from the wheel hub 10 when the brake rotor 60 is mounted to the wheel hub 10.

The inner side 104 may face toward the brake rotor axis 70. The inner side 104 may also encircle the brake rotor axis 70. The inner side 104 may extend between the mounting flange 80 and the hub mounting flange 82. For instance, the inner side 104 may extend from a mounting flange 80 in a direction that extends away from the tone ring 62 to the hub mounting flange 82.

The outer side 106 may be disposed opposite the outer side 106. As such, the outer side 106 may face away from the axis 20. The outer side 106 may extend between the second panel 74 and the second end 102.

One or more mounting flanges 80 may be provided with the brake rotor 60. In the configuration shown, a plurality of mounting flanges 80 are illustrated that are arranged around the brake rotor axis 70 and that are spaced apart from each other such that a gap is provided between adjacent mounting flanges. It is also contemplated that one or more gaps may be omitted and that a single mounting flange 80 may be provided. The mounting flange 80 may facilitate mounting of the tone ring 62 to the brake rotor 60. The mounting flange 80 may extend from the inner side 104 of the annular wall 78 toward the brake rotor axis 70. In at least one configuration, the mounting flange 80 may have a first side 110, a second side 112, a step surface 114, one or more through holes 116, or combinations thereof.

The first side 110 may face toward the tone ring 62 and may contact or engage the tone ring 62. The first side 110 may be disposed substantially perpendicular to the brake rotor axis 70.

The second side 112 may be disposed opposite the first side 110. As such, the second side 112 may face toward the hub mounting flange 82. The second side 112 may also be spaced apart from the hub mounting flange 82. The second side 112 may extend from the annular wall 78 toward the brake rotor axis 70. For instance, the second side 112 may extend from the inner side 104 of the annular wall 78 toward the brake rotor axis 70. In the configuration shown, the second side 112 extends at an angle from the inner side 104 such that the second side 112 is disposed in a nonparallel and non-perpendicular orientation with respect to the brake rotor axis 70. In such a configuration, the second side 112 may be disposed at an oblique angle with respect to the first side 110. It is also contemplated that the second side 112 may be disposed substantially perpendicular to the brake rotor axis 70 in other configurations.

The step surface 114 may be axially positioned between the first side 110 and the second side 112. In addition, the step surface 114 may be spaced apart from the first side 110 and the second side 112. The step surface 114 may be disposed substantially perpendicular to the brake rotor axis 70. As such, the step surface 114 may be disposed substantially parallel to the first side 110.

It is contemplated that the second side 112 or the step surface 114 may be omitted. For instance, the second side 112 may be omitted, which may result in a mounting flange 78 having a generally rectangular cross section.

One or more through holes 116 may be provided with a mounting flange 80. In the configuration shown, each mounting flange 80 has a single through hole. The through hole 116 may receive a rivet 64, 64', examples of which is best shown in FIGS. 1, 2, 6, and 7, that attaches the tone ring 62 to the brake rotor 60 as will be discussed in more detail below. The through hole 116 may extend from the first side 110 to the second side 112 or from the first side 110 to the step surface 114 if the second side 112 is omitted. In addition, the through hole 116 may extend along a through hole axis 120. The through hole axis 120 may be disposed substantially parallel to the brake rotor axis 70. The step surface 114 be axially positioned along the through hole axis 120 or the respect to the through hole axis 120 between the first side 110 and the second side 112. In at least one configuration, the through hole 116 may have a first hole portion 140 and a second hole portion 142.

The first hole portion 140 may extend from the first side 110 to the step surface 114. In at least one configuration, the first hole portion 140 may be disposed closer to the through hole axis 120 than the second hole portion 142 is disposed to the through hole axis 120. For instance, the first hole portion 140 may have a smaller diameter than the second hole portion 142. The first hole portion 140 is unthreaded.

The second hole portion 142 may extend from the second side 112 to the step surface 114. As such, the second hole portion 142 may be contiguous with the first hole portion 140. The second hole portion 142 may be unthreaded. The second hole portion 142 may be omitted when the second side 112 is not provided.

Referring primarily to FIGS. 3 and 4, the hub mounting flange 82 may facilitate mounting of the brake rotor 60 to the wheel hub 10. The hub mounting flange 82 may extend from the annular wall 78 toward the brake rotor axis 70. The hub mounting flange 82 may encircle the brake rotor axis 70 and may be spaced apart from the mounting flange 80. The hub mounting flange 82 may extend further toward the brake rotor axis 70 than the mounting flange 80 extends toward the brake rotor axis 70. In at least one configuration, the hub mounting flange 82 may define a set of fastener holes 150 and a set of access holes 152.

Referring to FIG. 3, the fastener holes 150 may facilitate coupling of the brake rotor 60 to the wheel hub 10. The fastener holes 150 may have any suitable configuration. For instance, the fastener holes 150 may be configured as through holes that may extend through the hub mounting flange 82. Each fastener hole 150 may be configured to receive a fastener 52 that may couple the brake rotor 60 to the wheel hub 10. The fastener holes 150 may be unthreaded.

Referring to FIGS. 3 and 4, the access holes 152, if provided, may be spaced apart from the fastener holes 150. For instance, an access hole 152 may be disposed further from the brake rotor axis 70 than a fastener hole 150 is disposed from the brake rotor axis 70. A plurality of access holes 152 may be provided that are arranged around the brake rotor axis 70. The access holes 152 may be spaced apart from the fastener holes 150 and spaced apart from each other. As is best shown in FIG. 4, an access hole 152 may be configured as an unthreaded through hole that may extend through the hub mounting flange 82. An access hole 152 may be aligned with a corresponding through hole 116 in the mounting flange 80 that is configured to receive a rivet 64. As such, the access hole 152 may be coaxially disposed with the through hole 116.

An access hole 152 may intersect or may be coextensive with a portion of the through hole 116, such as the second hole portion 142 of the through hole 116. For instance, an access hole 152 may extend from the second end 102 of the annular wall 78 through the hub mounting flange 82 to the second hole portion 142 of the mounting flange 80. In at least one configuration, the access hole 152 may have substantially the same diameter or radius as the second hole portion 142.

The access hole 152 and the second hole portion 142 may be connected by an undercut surface 160. The undercut surface 160 may be configured as a recess or undercut in the annular wall 78. For instance, the undercut surface 160 may be an arcuate surface or curved surface that may be radially disposed with respect to the through hole axis 120. The access hole 152 may facilitate insertion of a mandrel that may facilitate upsetting of the rivet 64 as will be discussed in more detail below.

Referring primarily to FIGS. 2-4, the tone ring 62 may be fixedly mounted to the brake rotor 60. As such, the tone ring 62 may rotate with the brake rotor 60 about the brake rotor axis 70. The tone ring 62 may be made of a different material than the brake rotor 60. For instance, the tone ring 62 may be a steel (e.g., stainless steel) component. The stainless steel may be a ferritic stainless steel that may be magnetic. The tone ring 62 may be configured as a ring that may encircle the brake rotor axis 70 and may include a tone ring mounting flange 170 and a set of tone ring teeth 172.

The tone ring mounting flange 170 may contact or engage the brake rotor 60. For instance, the tone ring mounting flange 170 may contact or engage a side of the mounting flange such as the first side 110. The tone ring mounting flange 170 may define one or more tone ring holes 174.

A tone ring hole 174 may be a through hole that is aligned with a through hole 116 in the mounting flange 80 of the brake rotor 60. The tone ring hole 174 may receive a rivet 64, 64' that attaches the tone ring 62 to the brake rotor 60 as will be discussed in more detail below.

The tone ring teeth 172 may be arranged around the brake rotor axis 70 in a repeating arrangement. As is best shown in FIG. 4, the tone ring teeth 172 may protrude axially from the tone ring 62 in a direction that extends away from the annular wall 78, or to the left from the perspective shown. In at least one configuration, each tone ring tooth 172 may extend along a radial line with respect to the brake rotor axis 70. As is best shown in FIG. 3, a gap or recess may be provided between adjacent tone ring teeth 172.

One or more rivets 64, 64' may secure the tone ring 62 to the brake rotor 60. In the configurations shown, the tone ring 62 is secured to the brake rotor 60 with ten rivets 64, 64'; however, it is contemplated that a greater or lesser number of rivets 64, 64' may be provided. The rivet 64, 64' may extend along a rivet axis 180, 180'. The rivet axis 180, 180' may extend substantially parallel to and may be coaxially disposed with the through hole axis 120 when the rivet 64, 64' is installed.

A rivet may be of any suitable type and may have any suitable configuration. For instance, the rivet may be configured as a solid rivet, a tubular rivet, a blind rivet, a split rivet, or the like. In the configuration shown in FIGS. 5 and 6, the rivet 64 is illustrated as being a tubular rivet, which is similar in structure to a solid rivet but has an indentation or blind hole 182 at the tip of the rivet shank 184 of the rivet 64. The blind hole 182 helps reduce the amount of force required to upset the rivet 64 as compared to a solid rivet. Upsetting the rivet 64 may roll a tubular portion 186 of the rivet shank 184 that encircles the blind hole 182 outward and away from the rivet axis 180.

Figure 5:
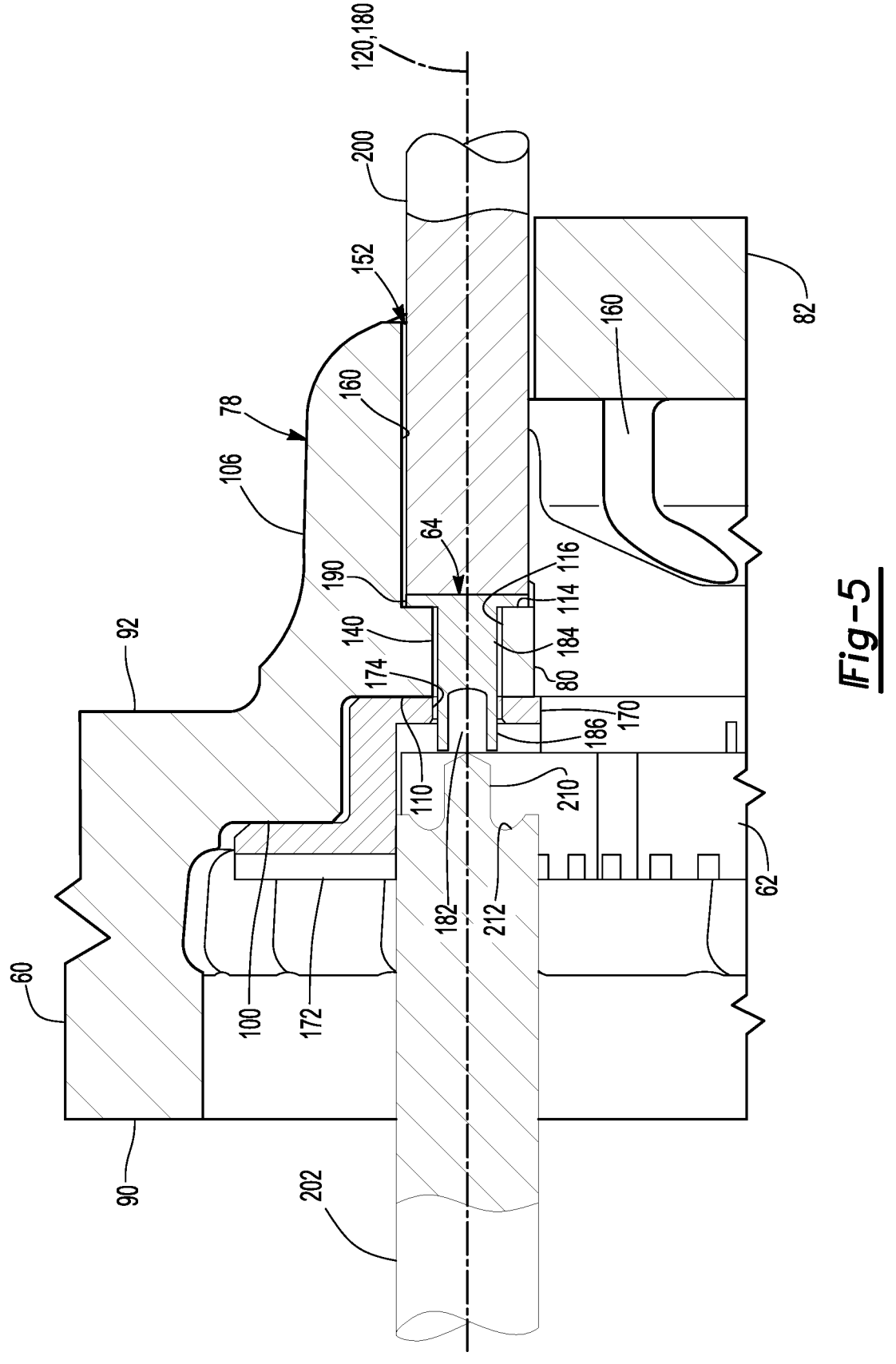
FIGS. 5 and 6 are magnified section views that illustrate installation of a rivet.

Referring to FIG. 5, the rivet 64 is shown prior to being upset and may include a first rivet head 190. The first rivet head 190 may be disposed at an end of the rivet shank 184 that is disposed opposite the tip from which the blind hole 182 extends. The first rivet head 190 may extend further away from the rivet axis 180 than the rivet shank 184 and may be integrally formed with the rivet shank 184. As such, the first rivet head 190 may be formed with the rivet shank 184 prior to the rivet 64 being upset.

In at least one configuration, the rivet shank 184 and the first rivet head 190 may have circular or substantially circular cross sections. The rivet shank 184 may be sized to fit into the through hole 116 in the mounting flange 80 and the tone ring hole 174 in the tone ring 62 prior to being upset. For instance, the rivet shank 184 may have a smaller diameter than the through hole 116 and the tone ring hole 174 so that the rivet shank 184 may be inserted into and pass through the through hole 116 and the tone ring hole 174. The first rivet head 190 may have a larger diameter than the through hole 116 and the tone ring hole 174 to help axially position the rivet 64.

A method of assembling a brake rotor assembly 12 will now be described. As an overview, the tone ring 62 may be secured to the brake rotor 60 using one or more rivets 64, 64'. The rivets 64, 64' may be used instead of other types of fasteners, such as threaded fasteners like bolts or screws, pins, roll pins, clips, hooks, welding, an adhesive, or the like. As such, one or more rivets 64, 64' may be the sole mechanism or mechanical component used to secure the tone ring 62 to the brake rotor 60. It is also contemplated that other types of fasteners could be used in addition to rivets 64, 64' and that such fasteners could be used for positioning purposes or for securing the tone ring 62 to a lesser degree than a rivet 64, 64'. The method will be described in the context of the brake rotor 60 and the tone ring 62 being provided as separate parts prior to assembly. In addition, the method will primarily be described in the context of moving or positioning the smaller and lighter tone ring 62 with respect to the larger and heavier brake rotor however, it is contemplated that the brake rotor 60 may be moved or positioned with respect to the tone ring 62 or that the brake rotor 60 and the tone ring 62 may both be moved to position the brake rotor 60 and tone ring 62 with respect to each other.

Figure 6:
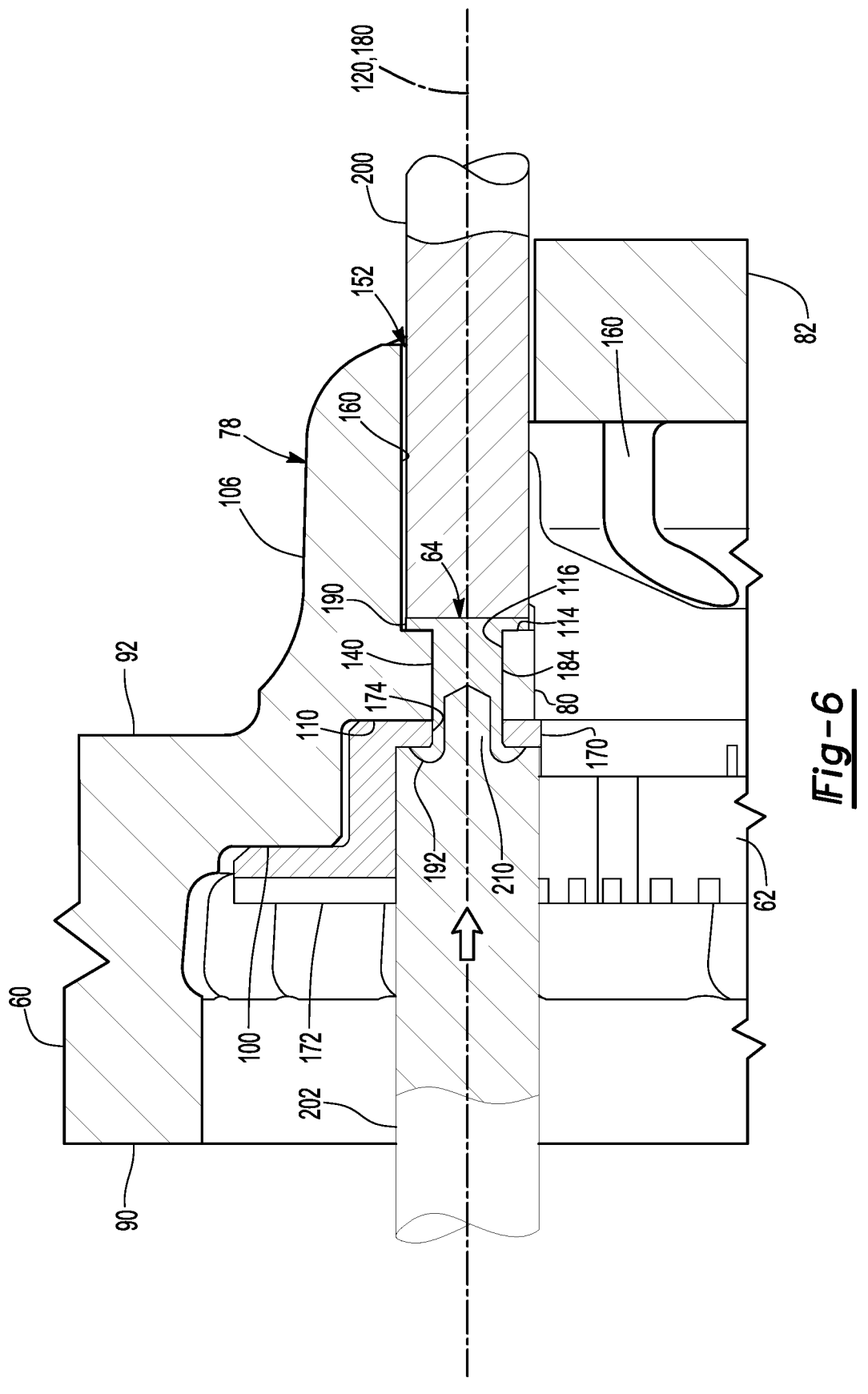

A method of assembly utilizing a rivet 64 is best understood with reference to FIGS. 4-6.

Referring to FIG. 4, the tone ring 62 may be positioned with respect to the brake rotor Positioning the tone ring 62 may include engaging the tone ring 62 with the brake rotor 60 and orienting the tone ring 62 about the brake rotor axis 70 with respect to the brake rotor 60. The tone ring 62 may be oriented such that the tone ring teeth 172 face away from the annular wall 78 and the mounting flange 80 of the brake rotor 60. The tone ring mounting flange 170 may be placed into contact with the first side 110 of the mounting flange 80. If necessary, the tone ring 62 may be rotated about the brake rotor axis 70 to align a tone ring hole 174 with a through hole 116 in the mounting flange 80. The through hole 116 and the tone ring hole 174 may be sufficiently aligned when the rivet shank 184 of a rivet 64 can be inserted through the through hole 116 and through the tone ring hole 174.

Referring to FIG. 5, the rivet 64 may be inserted into the through hole 116 and a corresponding tone ring hole 174. The rivet shank 184 may have a clearance fit in the through hole 116 with respect to the mounting flange 80 and a clearance fit in the tone ring hole 174 with respect to the tone ring 62 prior to being upset. This is represented by the radial gap surrounding the rivet shank 184 in FIG. 5. In the configuration shown, the rivet 64 is oriented such that the rivet shank 184 is inserted through the through hole 116 in the mounting flange 80 before being inserted through the tone ring hole 174 in the tone ring 62; however, it is contemplated that the rivet 64 may be inserted in the opposite direction. Thus, in the configuration shown the rivet 64 may be inserted axially through the second hole portion 142 of the through hole 116, then through the first hole portion 140 of the through hole 116, and then through the tone ring hole 174. The first rivet head 190 may contact or engage the mounting flange 80 after the rivet 64 is inserted. For instance, the first rivet head 190 may contact or engage the step surface 114.

As is also shown in FIG. 5, a first mandrel 200 and a second mandrel 202 may be positioned with respect to the rivet 64. The first mandrel 200 and the second mandrel 202 may cooperate to exert force against the rivet 64 to upset the rivet 64.

The first mandrel 200 may be configured to contact or engage the first rivet head 190. More specifically, a distal end of the first mandrel 200 may contact or engage a side of the first rivet head 190 that faces away from the rivet shank 184. The first mandrel 200 may be engaged with the first rivet head 190 prior to or simultaneously with engaging the second mandrel 202 with the rivet shank 184. Engaging the first mandrel 200 with the first rivet head 190 may include positioning at least a portion of the first mandrel 200 between the mounting flange 80 of the brake rotor 60 and the hub mounting flange 82 of the brake rotor 60. Such positioning may be accomplished in various ways. As one example, the first mandrel 200 may be inserted through a corresponding access hole 152 in the brake rotor 60 and moved axially toward the first rivet head 190 to engage the distal end of the first mandrel 200 with the first rivet head 190. As another example, the first mandrel 200 may be positioned in the gap between the mounting flange 80 and the hub mounting flange 82 without being inserted through an access hole 152 in the brake rotor This may be accomplished using a first mandrel 200 that extends away from the brake rotor axis 70 and toward the inner side 104 of the annular wall 78 or upward from the perspective shown in FIG. 5. For instance, the first mandrel 200 may have a bent or hooked end that may extend toward the inner side 104 and then hook or bend toward the first rivet head 190. In either configuration, the distal end of the first mandrel 200 may extend into the second hole portion 142 of the through hole 116 when a second hole portion 142 is provided.

The second mandrel 202 may be configured to contact or engage the rivet shank 184. More specifically, a distal end of the second mandrel 202 may contact or engage the tip of the rivet shank 184 that is disposed opposite the first rivet head 190. In the configuration shown, the second mandrel 202 includes a protrusion 210 and an annular recess 212. The protrusion 210 may be insertable into the blind hole 182 in the rivet shank 184 and may extend along the rivet axis 180. The annular recess 212 may encircle the protrusion 210 and may be recessed in an axial direction away from the protrusion 210. As such, the protrusion 210 and the annular recess 212 may extend in opposite axial directions. The annular recess 212 may have a concave configuration that may facilitate forming of a second rivet head 192 when the rivet 64 is upset.

Referring to FIG. 6, the rivet 64 may be upset. The rivet 64 may be upset by exerting a sufficient compressive axial force against the rivet 64 with the first mandrel 200 and the second mandrel 202. Force may be exerted along the rivet axis 180. Force exerted by the first mandrel 200 may be directed toward the second mandrel 202 and vice versa. In FIG. 6, the first mandrel 200 may hold the first rivet head 190 against the step surface 114 while the second mandrel 202 exerts force against the rivet shank 184. Upsetting the rivet 64 may form or reshape the rivet 64 in multiple ways.

First, upsetting the rivet 64 forms the second rivet head 192. In the case of a tubular rivet, the tubular portion 186 of the rivet shank 184 may be rolled outward and away from the rivet axis 180 as the tubular portion 186 engages the portion of the first mandrel 200 that defines the annular recess 212 while being axially compressed toward the first rivet head 190. In the case of a solid rivet, the rivet shank may be flattened and forced away from the rivet axis 180 while being axially compressed toward the first rivet head 190. In the configuration shown in FIG. 6, the second rivet head 192 is formed against a side of the tone ring mounting flange 170 that faces away from the mounting flange 80. Thus, the first rivet head 190 and the second rivet head 192 may cooperate to inhibit axial movement of the tone ring 62 with respect to the mounting flange 80 of the brake rotor 60.

Second, upsetting the rivet 64 expands the portion of the rivet 64 that is disposed in the through hole 116 and the portion of the rivet 64 that is disposed in the tone ring hole 174 in a direction that extends away from the rivet axis 180. As a result, the outer side or outside diameter of the rivet shank 184 may be expanded into contact with the brake rotor 60 in the through hole 116 and into contact with the tone ring 62 in the tone ring hole 174. Thus, the rivet shank 184 may be expanded away from the rivet axis 180 to substantially eliminate (e.g., fill at least 95% of the gap) or completely eliminate the gap between the rivet shank 184 that was present before the rivet 64 was upset.

Rivets 64 may be upset simultaneously or sequentially. Multiple mandrels may be provided for upsetting multiple rivets 64. After the rivets 64 are upset, the tone ring 62 is secured to the brake rotor 60 and the first mandrel 200 and the second mandrel 202 may be removed.

Figure 7:
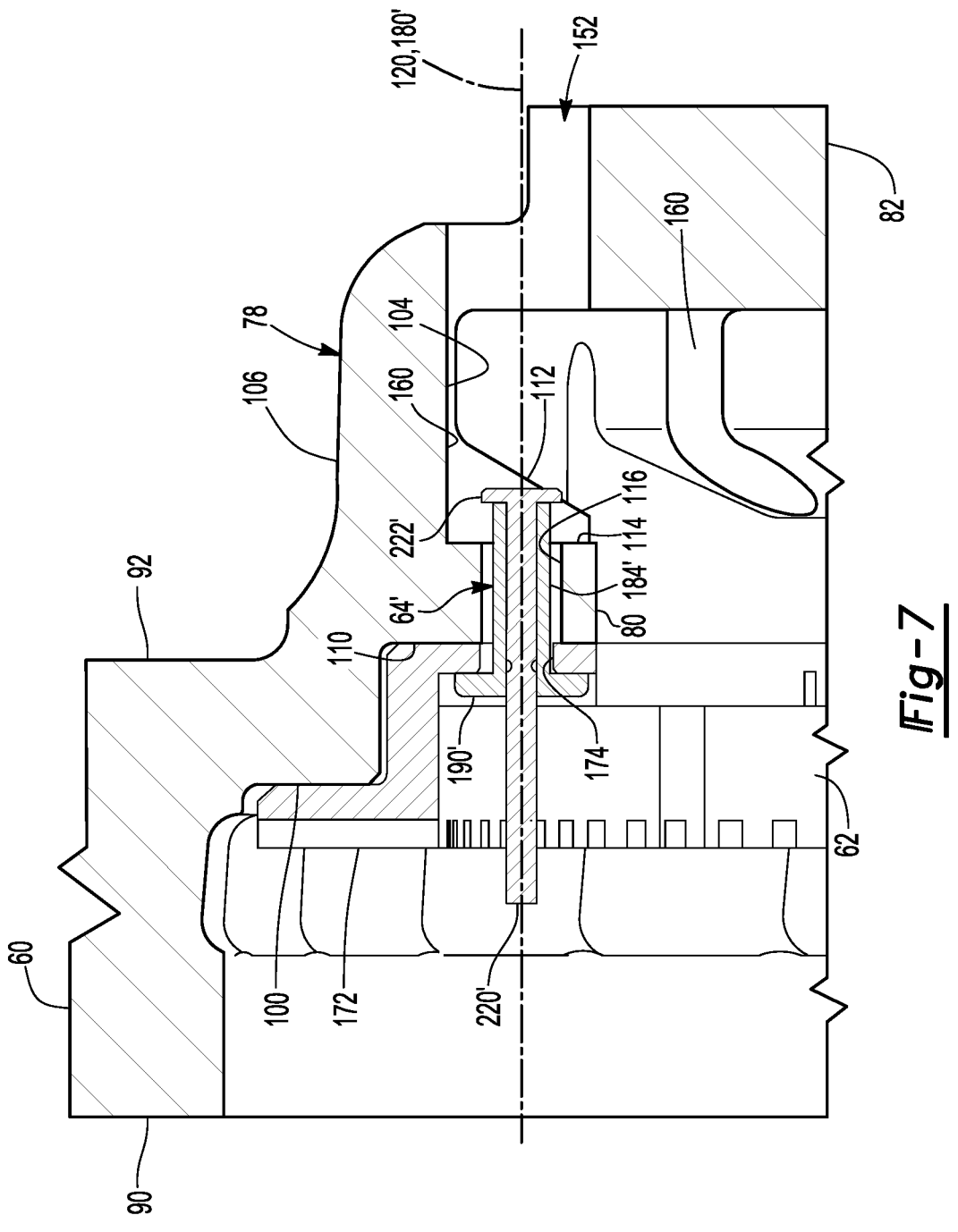
FIGS. 7-9 are magnified section views that illustrate installation of a rivet that is configured as a blind rivet.
Figure 8:
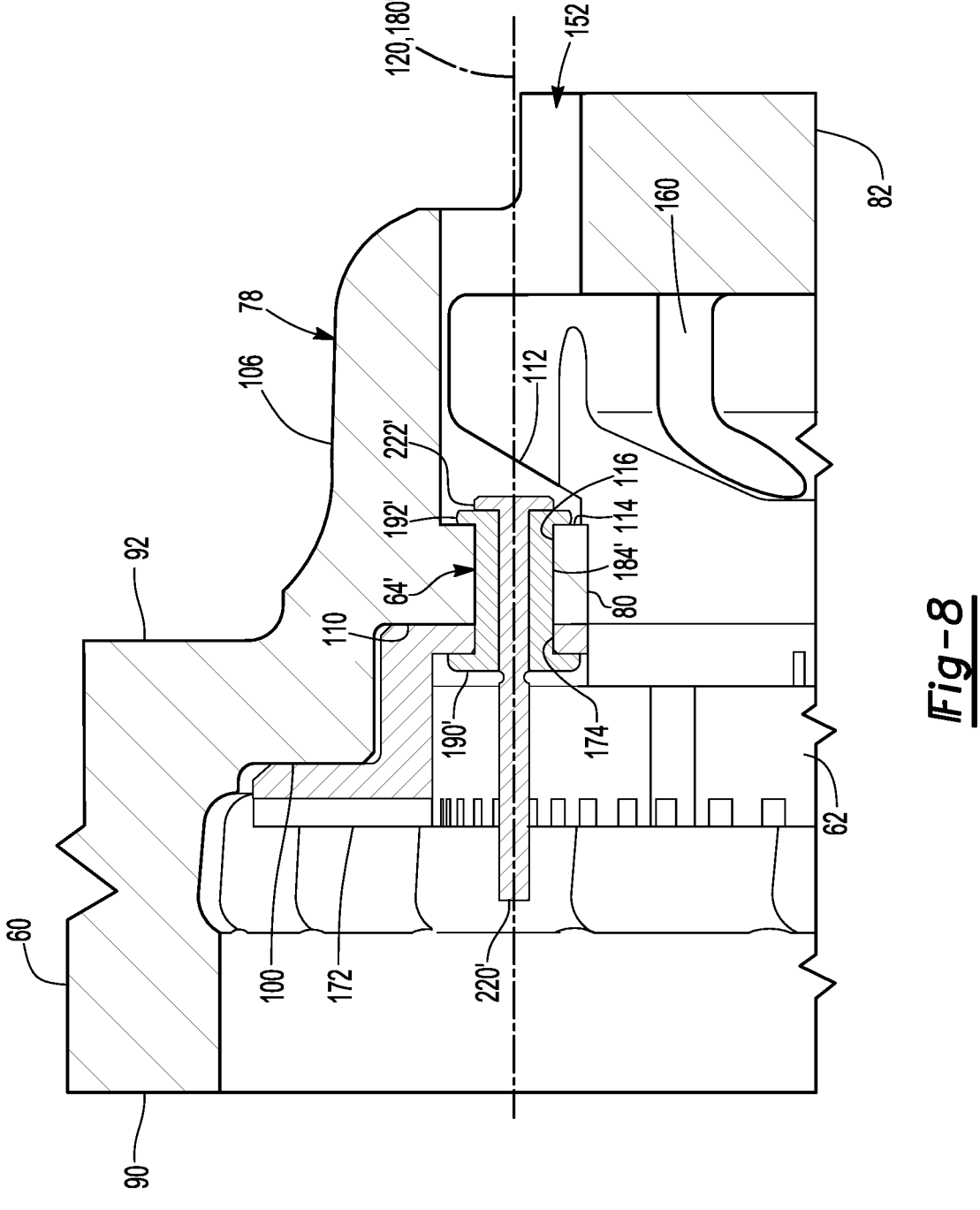
Figure 9:
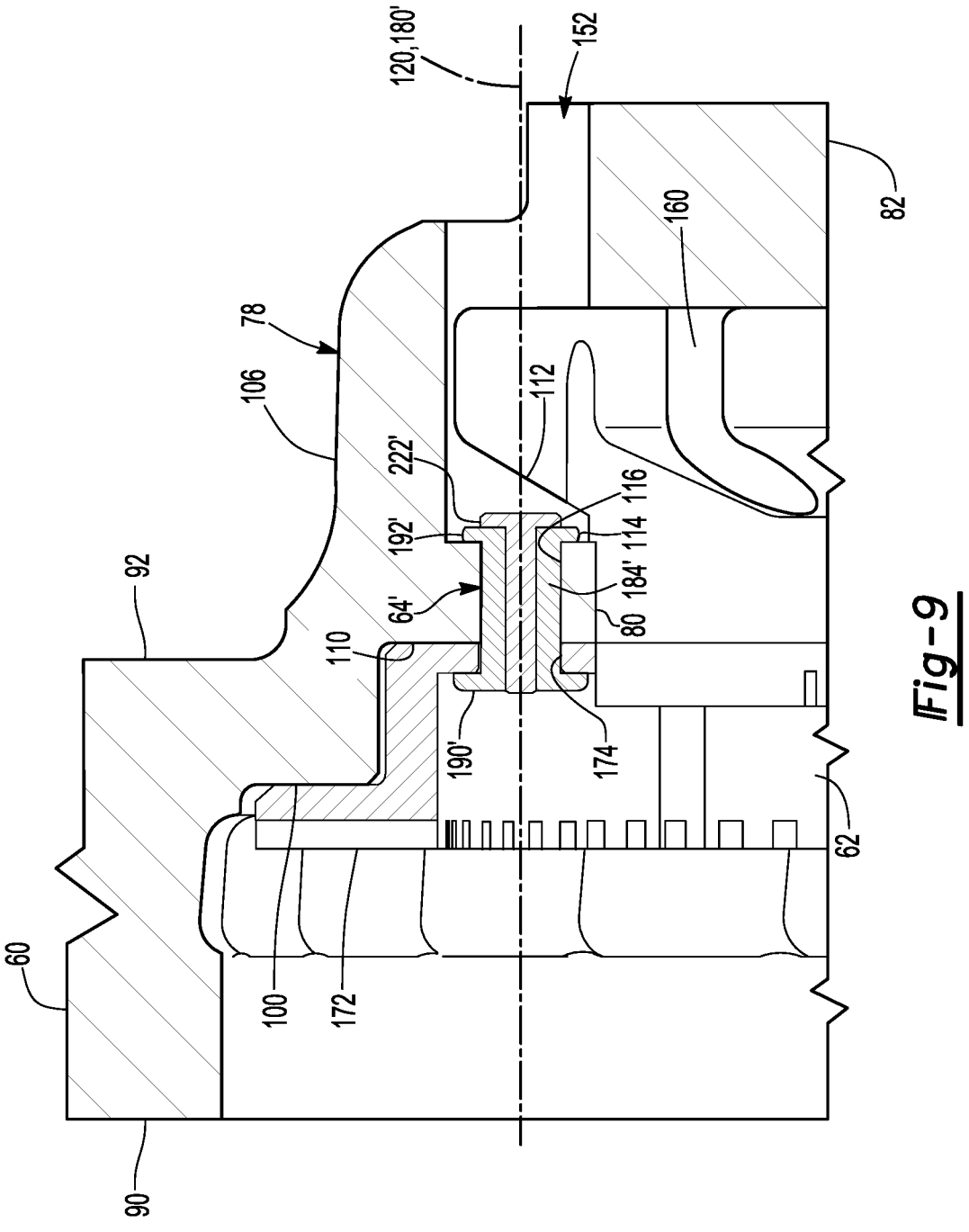

Referring to FIGS. 7-9, another method of assembling a brake rotor assembly 12 is illustrated. In this configuration, the rivet 64' is configured as a blind rivet.

Referring to FIG. 7, the rivet 64' may extends along a rivet axis 180 ' and may include a rivet shank 184' and a first rivet head 190'. The rivet shank 184' may be a hollow tubular structure. The first rivet head 190' may be integrally formed with the rivet shank 184' and may extend from an end of the rivet shank 184' in a direction that extends away from the rivet axis 180'. The rivet 64' may also include a rivet mandrel 220'. The rivet mandrel 220' may extend through the rivet shank 184'. The rivet mandrel 220' may have a rivet mandrel head 222'. The rivet mandrel head 222' may be disposed at an end of the rivet mandrel 220' that is disposed opposite the first rivet head 190'. The rivet mandrel head 222' may extend from an end of the rivet mandrel 220' in a direction that extends away from the rivet axis 180' and may be integrally formed with the rivet mandrel 220'.

The tone ring 62 may be secured to the brake rotor 60 using a blind rivet 64' in the following manner.

First, the tone ring 62 may be positioned with respect to the brake rotor 60 in the same manner as previously discussed with respect to FIG. 4.

Next, the rivet 64' may be inserted into a tone ring hole 174 in the tone ring 62 and into the through hole 116 in the mounting flange 80 of the brake rotor 60 as shown in FIG. 7. The rivet shank 184' may have a clearance fit in the through hole 116 with respect the mounting flange and a clearance fit in the tone ring hole 174 with respect to the tone ring 62 prior to being upset. This is represented by the radial gap surrounding the rivet shank 184' in FIG. 7. In the configuration shown, the rivet 64' is oriented such that the rivet shank 184' is inserted through the tone ring hole 174 in the tone ring 62 before being inserted through inserted through the through hole 116 in the mounting flange 80; however, it is contemplated that the rivet 64' may be inserted in the opposite direction. Thus, in the configuration shown the rivet 64' may be inserted axially through the tone ring hole 174, then through the first hole portion 140 of the through hole 116, and then through the second hole portion 142 of the through hole 116. The first rivet head 190' may contact or engage the tone ring 62 after the rivet 64' is inserted. For instance, the first rivet head 190' may contact or engage a side of the tone ring mounting flange 170 that faces away from the mounting flange 80.

Referring to FIG. 8, the rivet 64' may be upset. The rivet 64' may be upset by exerting a sufficient compressive axial force against the rivet 64' with a tool, such as a rivet gun that may be configured to upset the blind rivet. For instance, an axial force may be exerted against the first rivet head 190' to hold the first rivet head 190' against the side of the tone ring mounting flange 170 that faces away from the mounting flange 80. The rivet mandrel 220' may be actuated along the rivet axis 180' in the opposite axial direction to actuate the rivet mandrel head 222' against the distal end of the rivet shank 184' that is disposed opposite the first rivet head 190'. As such, the rivet mandrel head 222' may contact the distal end of the rivet shank 184' and may also be pulled into the rivet shank 184', thereby expanding the distal end of the rivet shank 184' away from the rivet axis 180' to form the second rivet head 192'. The second rivet head 192' may contact or engage the step surface 114. As such, the first rivet head 190' and the second rivet head 192' may cooperate to inhibit axial movement of the tone ring 62 with respect to the mounting flange 80 of the brake rotor 60.

In addition, upsetting the rivet 64' may expand the portion of the rivet 64 that is disposed in the through hole 116 and that is disposed in the tone ring hole 174 in a direction that extends away from the rivet axis 180'. For example, the rivet mandrel 220', the rivet mandrel head 222', or both, may expand a portion of the rivet shank 184' radially outward. As a result, the outer side or outside diameter of the rivet shank 184' may be expanded into contact with the brake rotor 60 in the through hole 116 and into contact with the tone ring 62 in the tone ring hole 174. Thus, the rivet shank 184' may be expanded away from the rivet axis 180' to substantially eliminate or completely eliminate the gap between the rivet shank 184' that was present before the rivet 64' was upset.

Referring to FIG. 9, at least a portion of the rivet mandrel 220' that protrudes out of the rivet 64' may be removed. For instance, a portion of the rivet mandrel 220' that protrudes from the first rivet head 190' may be removed. Removal may be accomplished by cutting off a portion of the rivet mandrel 220', snapping off a portion of the rivet mandrel 220', or the like.

The present invention may use a rivet to attach a tone ring to a brake rotor, thereby avoiding the design shortcomings of other types of fasteners or fastening techniques. A rivet provides improved fastening as it does not rely on stretching of a fastener shank or mere friction like other fasteners to prevent removal. A rivet is plastically deformed both radially and axially to provide more secure fastening that is more robust and better withstands mechanical loading, thermal loading, and vibrations that may occur during brake application. Upsetting a rivet creates and axial clamp load as well as radial loading that to rigidly couple the tone ring to the brake rotor. In addition, a rivet may better withstand deformation or expansion that occurs when a tone ring and brake rotor that are made of different materials and have different coefficients of thermal expansion and may better resist oxide jacking.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A brake rotor assembly comprising:

a brake rotor that encircles a brake rotor axis and has a mounting flange, wherein the mounting flange of the brake rotor extends toward the brake rotor axis and has a through hole;

a tone ring that engages the mounting flange of the brake rotor and that defines a tone ring hole; and a rivet that is disposed in the through hole and the tone ring hole and that fixedly secures the tone ring to the brake rotor, wherein the mounting flange has a first side that faces toward the tone ring and a second side that is disposed opposite the first side, and the through hole extends from the first side to the second side and wherein the through hole extends along a through hole axis and the mounting flange has a step surface that is axially positioned with respect to the through hole axis between the first side and the second side.

2. The brake rotor assembly of claim 1 wherein the brake rotor has a hub mounting flange that encircles the brake rotor axis and that is spaced apart from the mounting flange, wherein the hub mounting flange defines a fastener hole that is adapted to receive a fastener for coupling the brake rotor to a wheel hub and an access hole that is spaced apart from the fastener hole and that is aligned with the through hole.

3. The brake rotor assembly of claim 2 wherein the access hole is disposed further from the brake rotor axis than the fastener hole is disposed from the brake rotor axis.

4. The brake rotor assembly of claim 2 wherein the access hole and a second hole portion of the through hole have substantially the same radius and are connected by an undercut surface that is radially disposed with respect to a through hole axis.

5. The brake rotor assembly of claim 2 wherein the brake rotor has an annular wall that extends from the mounting flange to the hub mounting flange and the access hole is partially formed in the annular wall.

6. The brake rotor assembly of claim 1 wherein the first side is disposed substantially perpendicular to the brake rotor axis and the second side is disposed at an oblique angle with respect to the first side.

7. The brake rotor assembly of claim 1 wherein the through hole has a first hole portion that extends from the first side to the step surface, and a second hole portion that extends from the second side to the step surface, wherein the first hole portion is disposed closer to the through hole axis than the second hole portion is disposed to the through hole axis.

8. The brake rotor assembly of claim 1 wherein a first rivet head of the rivet contacts the step surface and a second rivet head of the rivet that is disposed opposite the first rivet head contacts the tone ring.

9. A method of assembling a brake rotor assembly, the method comprising:

positioning a tone ring against a brake rotor such that a tone ring hole is aligned with a through hole in the brake rotor to permit insertion of a rivet;

inserting the rivet into the through hole and the tone ring hole, wherein the rivet extends along a rivet axis; and upsetting the rivet to form a rivet head and to expand a portion of the rivet that is disposed in the through hole away from the rivet axis and into contact with the brake rotor in the through hole and to expand a portion of the rivet that is disposed the tone ring hole away from the rivet axis and into contact with the tone ring in the tone ring hole;

wherein the rivet has a first rivet head and inserting the rivet includes positioning the first rivet head into contact with a mounting flange of the brake rotor; and wherein the through hole extends along a through hole axis, the mounting flange has a first side that contacts the tone ring, a second side that is disposed opposite the first side, and a step surface that is axially positioned along the through hole axis between the first side and the second side, and inserting the rivet includes positioning the first rivet head into contact with the step surface.

10. The method of claim 9 wherein the rivet is a blind rivet.

11. The method of claim 10 wherein the rivet has a first rivet head and inserting the rivet includes positioning the first rivet head into contact with the tone ring.

12. The method of claim 11 wherein the rivet has a rivet mandrel that has a rivet mandrel head and upsetting the rivet includes actuating the rivet mandrel along the rivet axis toward the first rivet head to cause the rivet mandrel head to expand a portion of the rivet that is disposed in the through hole into contact with the brake rotor in the through hole and to expand a portion of the rivet that is disposed in the tone ring hole into contact with the tone ring in the tone ring hole, and then subsequently removing at least a portion of the rivet mandrel that protrudes from the first rivet head.

13. A method of assembling a brake rotor assembly, the method comprising:

positioning a tone ring against a brake rotor such that a tone ring hole is aligned with a through hole in the brake rotor to permit insertion of a rivet;

inserting the rivet into the through hole and the tone ring hole, wherein the rivet extends along a rivet axis; and upsetting the rivet to form a rivet head and to expand a portion of the rivet that is disposed in the through hole away from the rivet axis and into contact with the brake rotor in the through hole and to expand a portion of the rivet that is disposed the tone ring hole away from the rivet axis and into contact with the tone ring in the tone ring hole, wherein the rivet has a first rivet head and upsetting the rivet includes engaging a first mandrel with the first rivet head, engaging a second mandrel with an end of the rivet that is disposed opposite the first rivet head, and exerting force along the rivet axis and toward the rivet with the first mandrel and the second mandrel to upset the rivet.

14. The method of claim 13 wherein engaging the first mandrel with the first rivet head includes positioning the first mandrel between a mounting flange of the brake rotor and a hub mounting flange of the brake rotor that is spaced apart from the mounting flange.

15. The method of claim 13 wherein engaging a first mandrel with the first rivet head includes inserting the first mandrel through an access hole in a hub mounting flange of the brake rotor.

16. The method of claim 13 wherein the brake rotor has a mounting flange that has a first side that contacts the tone ring, a second side that is disposed opposite the first side, and a step surface that is axially positioned along a through hole axis of the through hole between the first side and the second side;

the through hole has a first hole portion that extends from the first side to the step surface and a second hole portion that extends from the second side to the step surface, the first hole portion having a smaller diameter than the second hole portion; and the first mandrel is inserted into the second hole portion.

* * * * *